US010027828B2

(12) United States Patent
Miura

(10) Patent No.: US 10,027,828 B2
(45) Date of Patent: Jul. 17, 2018

(54) HINGE CONNECTING PRINTER AND SCANNER

(71) Applicant: Brother Kogyo Kabushiki Kaisha, Nagoya-shi, Aichi-ken (JP)

(72) Inventor: Katsuro Miura, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/336,898

(22) Filed: Oct. 28, 2016

(65) Prior Publication Data

US 2017/0126910 A1 May 4, 2017

(30) Foreign Application Priority Data

Oct. 30, 2015 (JP) ................................. 2015-214281

(51) Int. Cl.
*H04N 1/00* (2006.01)
*B41J 29/02* (2006.01)

(52) U.S. Cl.
CPC .......... *H04N 1/00535* (2013.01); *B41J 29/02* (2013.01); *H04N 1/00554* (2013.01); *H04N 1/00559* (2013.01); *H04N 1/00795* (2013.01); *H04N 2201/0094* (2013.01)

(58) Field of Classification Search
CPC ........... H04N 1/00535; H04N 1/00795; H04N 1/00554; H04N 1/00559; H04N 2201/0094; B41J 29/02
See application file for complete search history.

(56) References Cited

U.S. PATENT DOCUMENTS

| 7,440,144 | B2 | 10/2008 | Yamaguchi | |
|---|---|---|---|---|
| 2004/0117948 | A1* | 6/2004 | Ohara | ...................... B41J 29/13 16/286 |
| 2005/0044664 | A1* | 3/2005 | Chang | ................ H04N 1/00543 16/327 |
| 2005/0134940 | A1* | 6/2005 | Shyu | .................. H04N 1/00519 358/474 |
| 2006/0092194 | A1 | 5/2006 | Yamaguchi | |

(Continued)

FOREIGN PATENT DOCUMENTS

| JP | 2003-087460 A | 3/2003 |
|---|---|---|
| JP | 2006-129369 A | 5/2006 |
| JP | 2013-074417 A | 4/2013 |

*Primary Examiner* — Alessandro Amari
*Assistant Examiner* — Roger W Pisha, II
(74) *Attorney, Agent, or Firm* — Banner & Witcoff, Ltd.

(57) ABSTRACT

A first hinge connects a scanner to a printer, which is below the scanner, to allow the scanner to pivot about a first axis extending along a first direction. The first hinge includes a first support portion supported by the scanner, a second support portion supported by the printer, and a first pivot portion defining the first axis. A housing of the scanner includes a side surface near the first axis and extending along the first direction and along a second direction perpendicular to a document support surface of the scanner, and an accommodating portion recessed in a third direction which is from the side surface toward the scanning unit. The first support portion includes a first end portion at which the first pivot portion is located, and a second end portion which includes an accommodated portion. The accommodated portion is accommodated in the accommodating portion of the housing.

8 Claims, 14 Drawing Sheets

(56) References Cited

U.S. PATENT DOCUMENTS

2010/0014127 A1* 1/2010 Osakabe ............ H04N 1/00519
358/497
2015/0015920 A1* 1/2015 Muraoka ............ H04N 1/00543
358/400

* cited by examiner

HINGE CONNECTING PRINTER AND SCANNER

CROSS-REFERENCE TO RELATED APPLICATION

This application claims priority from Japanese Patent Application No. 2015-214281 filed on Oct. 30, 2015, the content of which is incorporated herein by reference in its entirety.

FIELD OF DISCLOSURE

Aspects disclosed herein relate to a multifunction device.

BACKGROUND

A known image input/output apparatus disclosed, as an example of a multifunction device includes a scanner unit, a recording unit, and a hinge.

The scanner unit includes a scanner housing and a document platen disposed at an upper portion of the scanner housing. An upper surface of the document platen is configured to support a document. A reading section for reading an image of the document is disposed inside the scanner housing. The recording unit is disposed below the scanner unit and includes a recording unit housing and a liquid jet recording head disposed inside the recording unit housing. The recording unit housing has an opening through which a maintenance region is exposed. The hinge connects the scanner unit to the recording unit to allow the scanner unit to pivot about a pivot axis relative to the recording unit.

In the known image input/output apparatus, the scanner unit pivots down to conceal the maintenance region, and pivots up to expose the maintenance region through the opening of the recording unit.

SUMMARY

It may be beneficial to provide a multifunction device including a hinge which connects a scanner to a printer to allow the scanner to pivot relative to the printer while the hinge is positioned in a space-saving manner to reduce the size of the multifunction device in a vertical direction.

According to one or more aspects of the disclosure, a multifunction device comprises a scanner, a printer, and a first hinge. The scanner includes a housing, a support surface configured to support a document, and a scanning unit located in the housing and configured to scan an image of the document. The printer is disposed below the scanner and includes an image forming unit configured to form an image on a sheet. The first hinge connects the scanner to the printer to allow the scanner to pivot, about a first axis extending along a first direction, between a first position at which the scanner conceals an upper portion of the printer, and a second position at which the scanner exposes the upper portion of the printer. The first hinge includes a first support portion supported by the scanner, a second support portion supported by the printer, and a first pivot portion disposed between the first support portion and the second support portion and defining the first axis. The housing of the scanner includes a side surface near the first axis and extending along the first direction and along a second direction which is perpendicular to the support surface of the scanner, and an accommodating portion recessed in a third direction which is from the side surface toward the scanning unit. The first support portion of the first hinge includes a first end portion at which the first pivot portion is located, and a second end portion which is opposite to the first end portion in the third direction and includes an accommodated portion. The accommodated portion is accommodated in the accommodating portion of the housing.

In the above-described multifunction device, the accommodated portion of the second end portion of the first support portion of the first hinge is held in the accommodating portion of the housing of the scanner. This eliminates the necessity to fasten, by a screw, the first support portion of the first hinge to a lower surface of the housing of the scanner, and to provide, at the lower surface of the housing, a portion for screw fastening. Consequently, the size of the housing may be reduced in a vertical direction.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

An illustrative embodiment of the disclosure will be described with reference to the accompanying drawings.

Illustrative Embodiment

Figure 1:
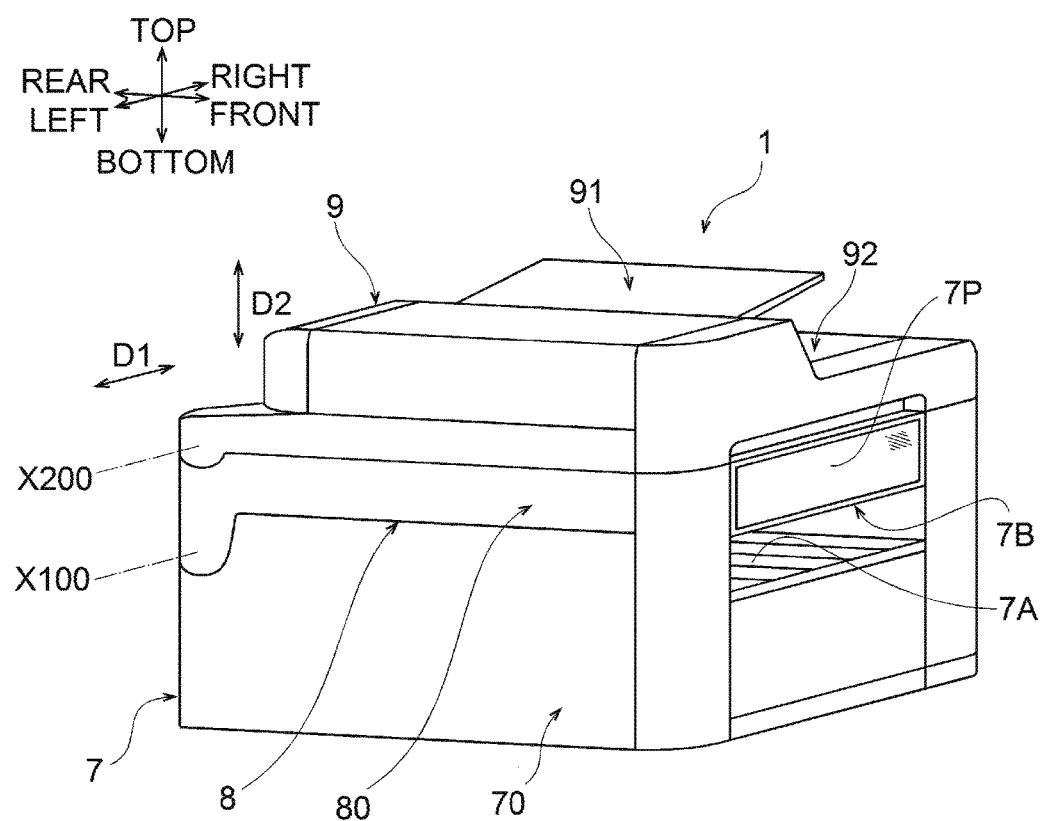
FIG. 1 is a perspective view of a multifunction device in an illustrative embodiment according to one or more aspects of the disclosure.

As illustrated in FIG. 1, a multifunction device 1 according to the illustrative embodiment is an example of a multifunction device. As illustrated in FIG. 1, a top-bottom direction may be defined with reference to an orientation of the multifunction device 1 that may be disposed in an orientation in which it may be intended to be used. A side of the multifunction device 1, in which a control panel 7P may be provided, may be defined as the front of the multifunction device 1. The right and left of the multifunction device 1 may be defined as viewed from the front of the multifunction device 1. A front-rear direction and a right-left direction may be defined with reference to the front of the multifunction device 1. The directions defined in FIG. 1 are applicable to all the drawings. Hereinafter, configuration of the multifunction device 1 will be described with reference to appropriate drawings.

<Overall Configuration>

Figure 2:
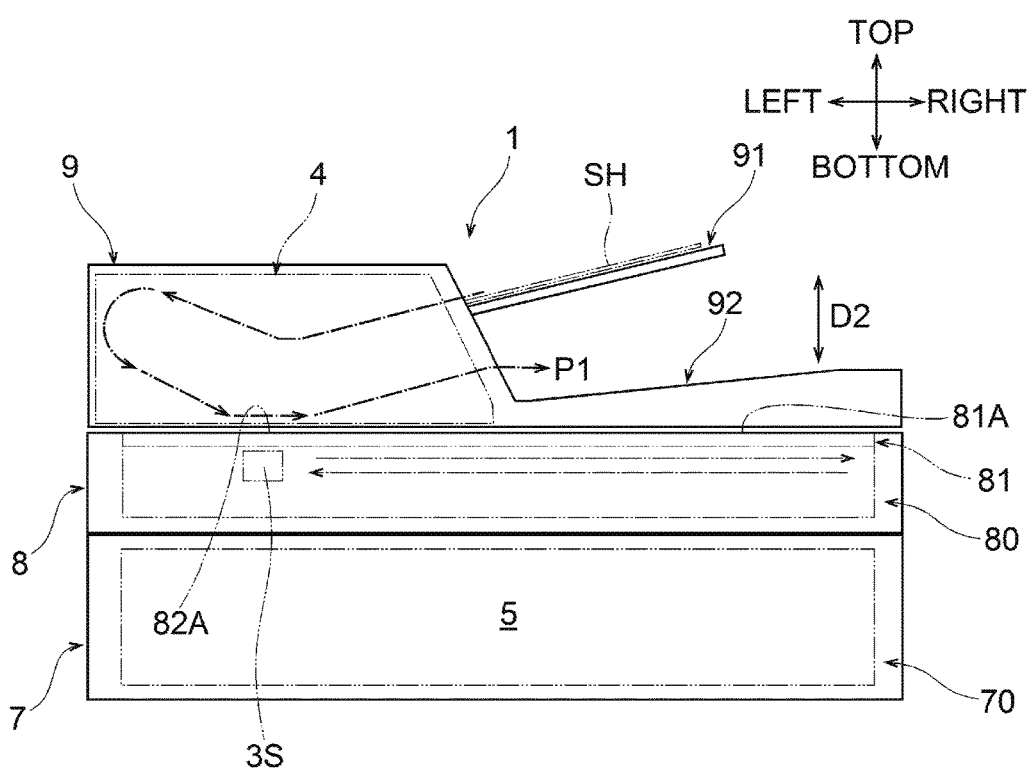
FIG. 2 is a schematic front view of the multifunction device in the illustrative embodiment according to one or more aspects of the disclosure.

As illustrated in FIGS. 1 to 8, the multifunction device 1 includes a scanner 8, a printer 7, a cover unit 9, a pair of first hinges 100 (e.g., right and left first hinges 100), and a pair of second hinges 200 (e.g., right and left second hinges 200). As illustrated in FIGS. 1 and 2, the printer 7 and the scanner 8 each have a substantially box shape with a relatively short height. The printer 7 is disposed below the scanner 8. The cover unit 9 is disposed above the scanner 8. That is, the printer 7, the scanner 8, and the cover unit 9 are disposed one above another in the top-bottom direction.

Figure 4:
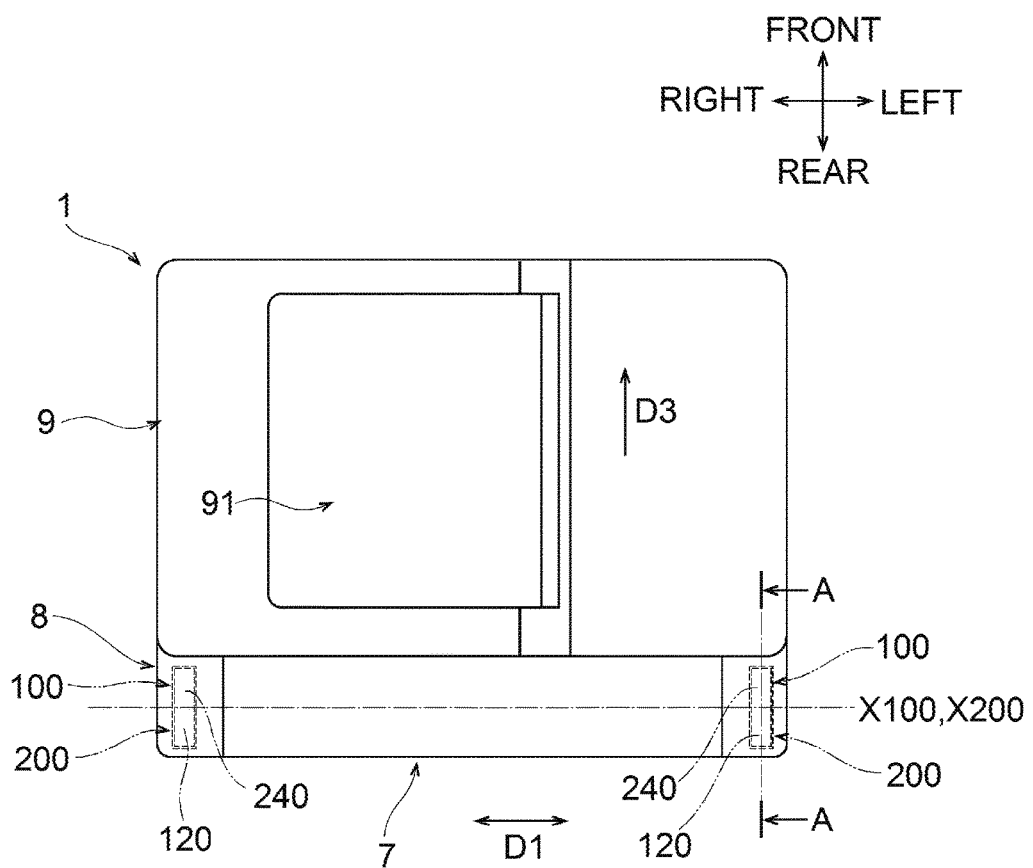
FIG. 4 is a top view of the multifunction device in the illustrative embodiment according to one or more aspects of the disclosure.

As illustrated in FIG. 4, when viewed from above, the multifunction device 1 has a substantially rectangular shape having longer sides extending along the right-left direction and shorter sides extending along the right-left direction. The right first hinge 100 and the right second hinge 200 are disposed at a right rear corner of the multifunction device 1 and the left first hinge 100 and the left second hinge 200 are disposed at a left rear corner of the multifunction device 1. The first hinges 100 overlap the respective second hinges 200 when viewed in the top-bottom direction. In the top view of FIG. 4, therefore, the first hinges 100 are substantially aligned with the respective second hinges 200 in the front-rear direction and in the right-left direction. The first hinges 100 and the second hinges 200 will be described in detail later. The right and left first hinges 100 have the same configuration. Similarly, the right and left second hinges 200 have the same configuration. In the explanation below, therefore, the left first hinge 100 and the left second hinge 200 will be described mainly, and the explanation for the right first hinge 100 and the right second hinge 200 will be omitted appropriately.

As illustrated in FIGS. 1, and 3 to 7, the first hinges 100 connect the scanner 8 to the printer 7 such that the scanner 8 is pivotable about a first axis X100 relative to the printer 7. The first axis X100 extends along a first direction D1 that corresponds to the right-left direction. The first hinges 100 may be free-stop hinges that are capable of holding the scanner 8 at an arbitrary angle with respect to the printer 7.

Figure 3:
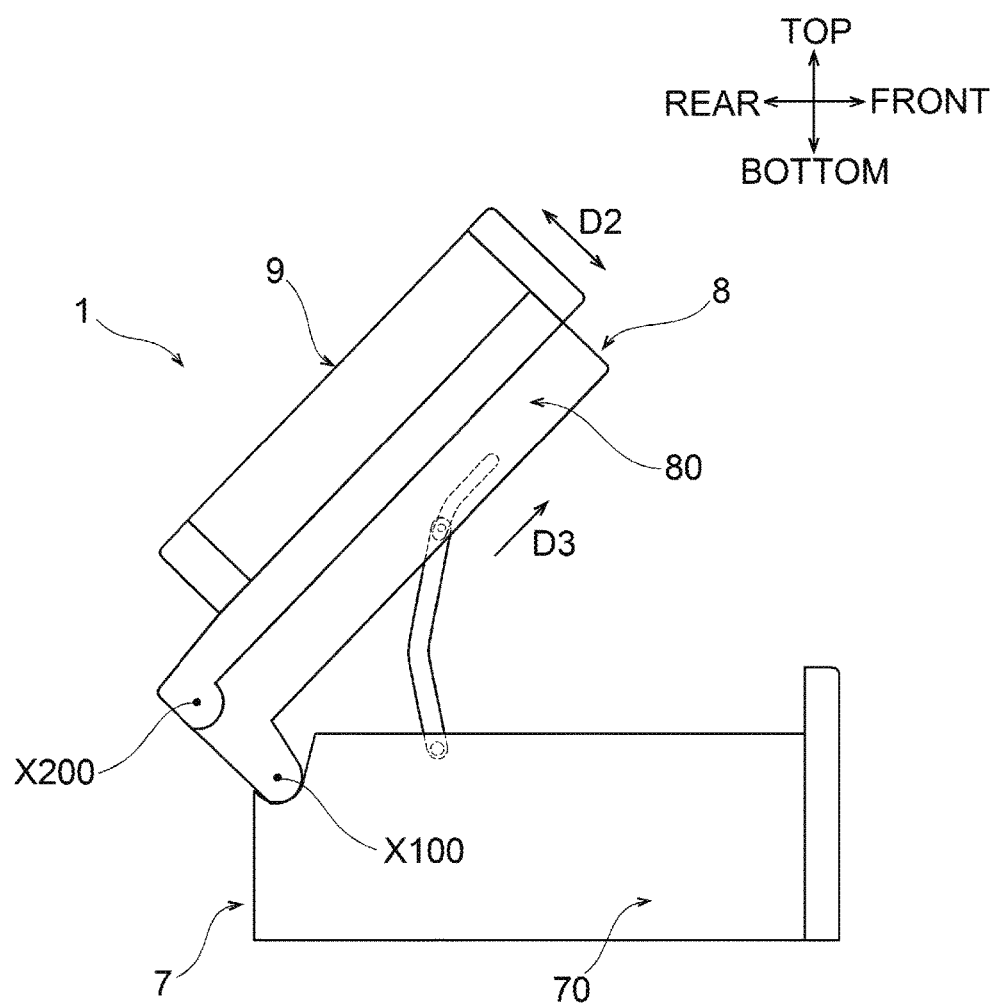
FIG. 3 is a left side view of the multifunction device in the illustrative embodiment according to one or more aspects of the disclosure, wherein a scanner is located at a second position.

The scanner 8 is configured to pivot between a first position (e.g., the position of the scanner 8 illustrated in FIGS. 1, 2, 5, and 7) and a second position (e.g., the position of the scanner 8 illustrated in FIGS. 3 and 6) via the first hinges 100. As illustrated in FIGS. 1, 2, 5, and 7, the scanner 8 at the first position conceals an upper portion of the printer 7. As illustrated in FIGS. 3, and 6, the scanner 8 at the second position exposes the upper portion of the printer 7.

As illustrated in FIGS. 1, and 3 to 7, the second hinges 200 connect the cover unit 9 to the scanner 8 such that the cover unit 9 is pivotable about a second axis X200 relative to the scanner 8. The second axis X200 extends also along the first direction D1. The second hinges 200 may be free-stop hinges that are capable of holding the cover unit 9 at an arbitrary angle with respect to the scanner 8.

The cover unit 9 is configured to pivot between a third position (e.g., the position of the cover unit 9 illustrated in FIGS. 1 2, 3, 5, and 6) and a fourth position (e.g., the position of the cover unit 9 illustrated in FIG. 7) via the second hinges 200. As illustrated in FIGS. 1 2, 3, 5, and 6, the cover unit 9 at the third position conceals a support surface 81A. As illustrated in FIG. 7, the cover unit 9 at the fourth position exposes the support surface 81A. Therefore, a user is enabled to place a document to be scanned onto the support surface 81A and the support surface 81A supports the document placed thereon.

As illustrated in FIG. 2, the printer 7 includes an image forming unit 5 accommodated therein. The image forming unit 5 is configured to form an image onto a recording sheet using an inkjet printing method or a laser printing method. As illustrated in FIG. 1, the printer 7 has an upper surface serving as a sheet discharge portion 7A. One or more recording sheets onto which respective images have been formed by the image forming unit 5 are discharged onto the sheet discharge portion 7A. The sheet discharge portion 7A and a lower surface of the scanner 8 define a cavity therebetween. The cavity serves as a sheet removal opening 7B for enabling the user to remove the one or more recording sheets discharged onto the sheet discharge portion 7A therefrom. The printer 7 has a front surface that extends upward so as to cover the front of the scanner 8. The printer 7 includes the control panel 7P at an upper portion of the front surface. The control panel 7P may be, for example, a touch panel. As illustrated in FIG. 3, when the scanner 8 is located at the second position (refer to FIGS. 3 and 6), a maintenance area (not illustrated) is exposed. The maintenance area may be an opening defined in the upper surface of the printer 7 and is positioned behind the sheet discharge portion 7A. Through the opening, maintenance of the image forming unit 5 may be implemented.

Figure 6:
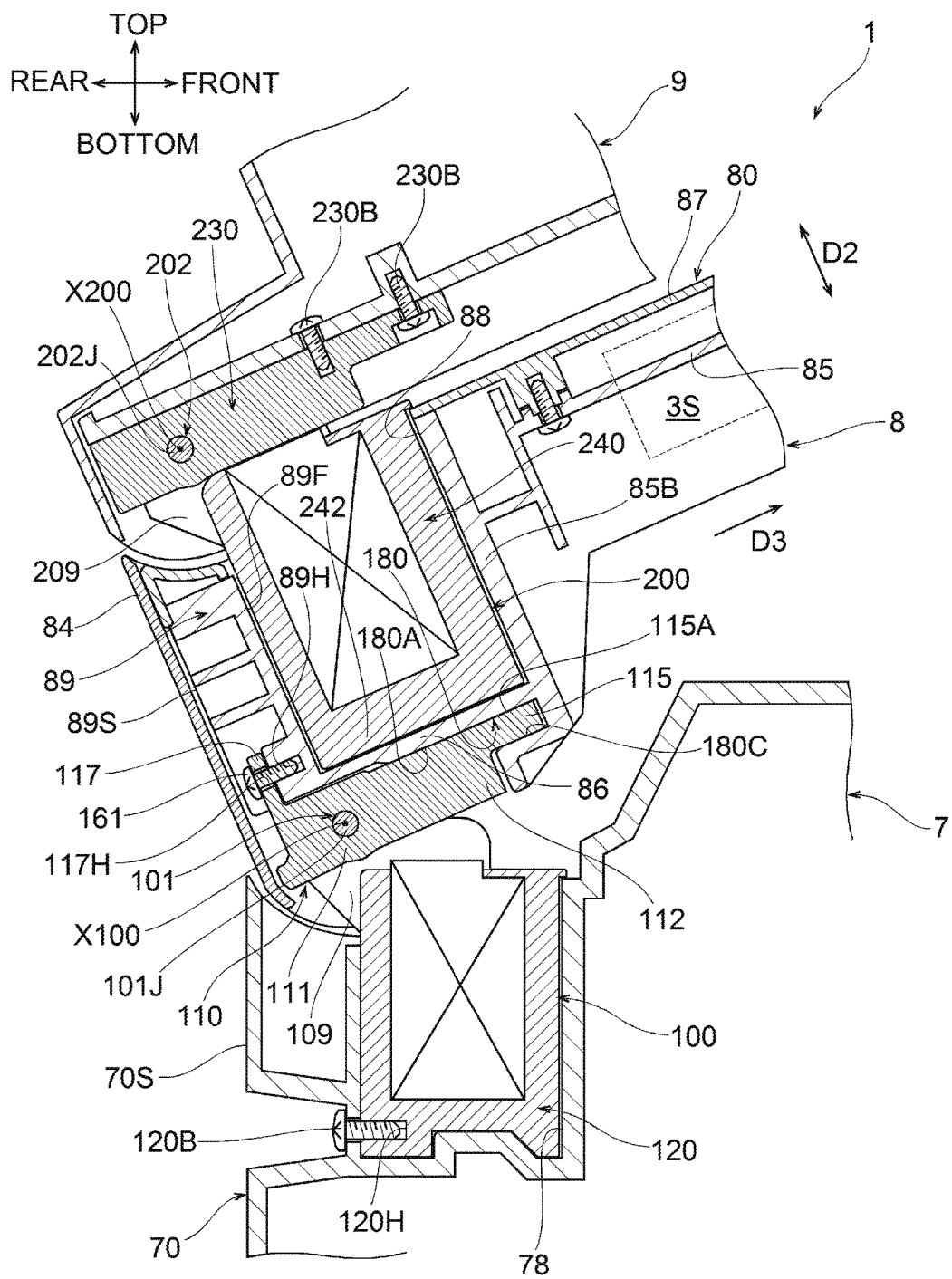
FIG. 6 is a partial sectional view taken along line A-A of FIG. 4 in the illustrative embodiment according to one or more aspects of the disclosure, and illustrating the left first hinge and the left second hinge when the scanner is located at the second position and the cover unit is located at the third position.
Figure 7:
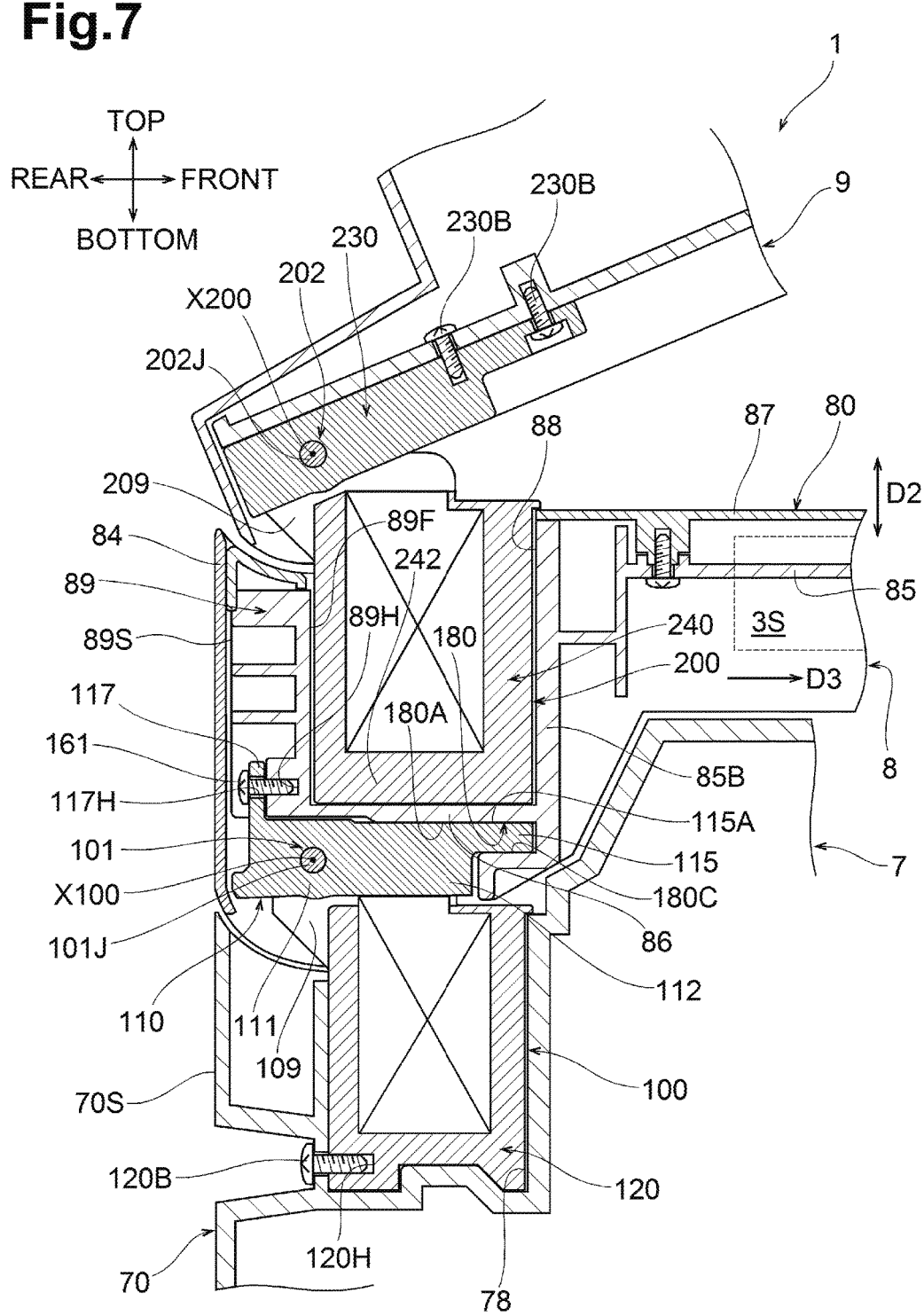
FIG. 7 is a partial sectional view taken along line A-A of FIG. 4 in the illustrative embodiment according to one or more aspects of the disclosure, and illustrating the left first hinge and the left second hinge when the scanner is located at the first position and the cover unit is located at a fourth position.
Figure 8:
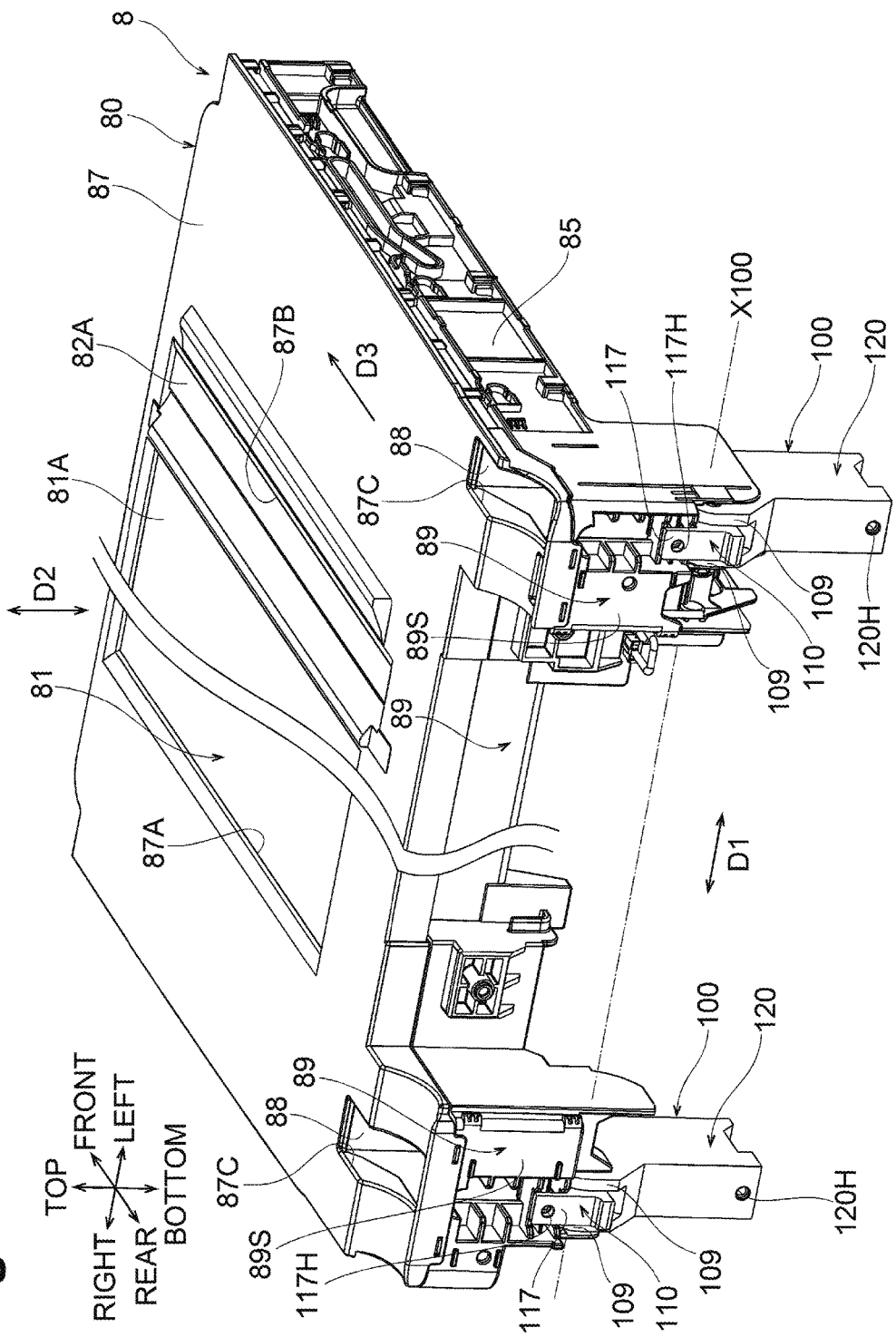
FIG. 8 is a partial perspective view of a scanner housing of the scanner and the first hinges in the illustrative embodiment according to one or more aspects of the disclosure.
Figure 9:
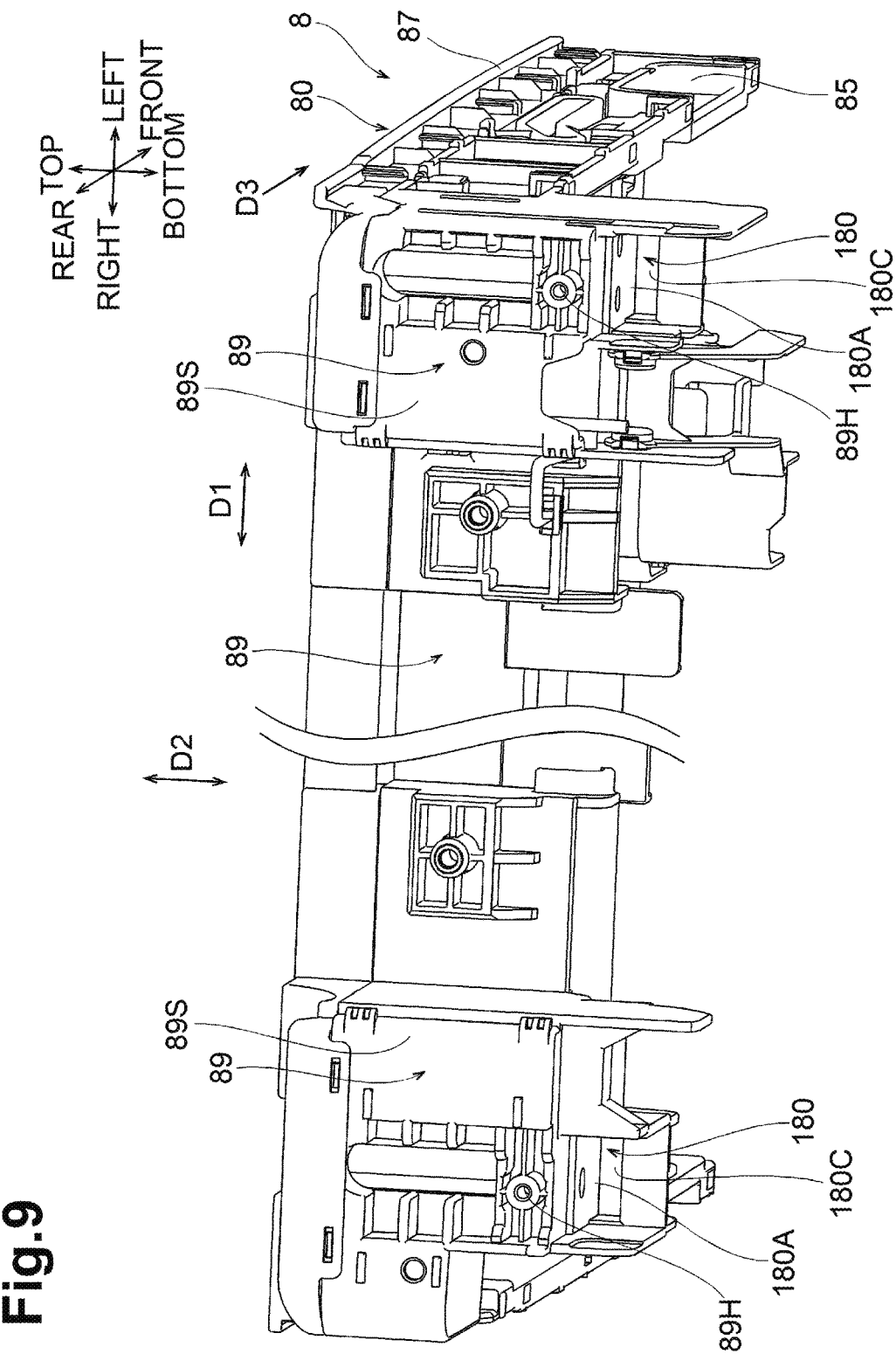
FIG. 9 is a partial perspective view of a rear surface of a wall and accommodating portions in the scanner housing of the scanner in the illustrative embodiment according to one or more aspects of the disclosure.

As illustrated in FIGS. 1, 2, 3, and 5 to 9, the scanner 8 includes a scanner housing 80. The scanner housing 80 is an example of a "housing". As illustrated in FIGS. 8 and 9, the scanner housing 80 includes a scanner base 85. The scanner base 85 has a shallow box shape having a bottom and front, rear, right, and left walls. The scanner base 85 has an open upper end. The scanner housing 80 further includes a scanner frame 87 that covers an upper portion of the scanner base 85. The scanner frame 87 has an opening in its central portion. The scanner housing 80 is an assembly of the scanner base 85 and the scanner frame 87. The scanner base 85 and the scanner frame 87 are assembled while a platen glass 81 is interposed therebetween (refer to FIGS. 2 and 8).

The platen glass 81 is exposed through the opening of the scanner frame 87 and defines a portion of an upper surface of the scanner 8.

As illustrated in FIGS. 5 to 9, the scanner base 85 includes a wall portion 89. The wall portion 89 may be a rear wall of the scanner base 5 and has a thickness in the front-rear direction. The wall portion 89 has a front surface 89F and a rear surface 89S. A plurality of ribs are disposed between the front surface 89F and the rear surface 89S. The rear surface 89S of the wall portion 89 is an example of a "side surface". As illustrated in FIGS. 8 and 9, the rear surface 89S of the wall portion 89 is located near the first axis X100 and extends along both the first direction D1 and a second direction D2. The second direction D2 extends perpendicular to the support surface 81A. The rear surface 89S might not necessarily be a flat surface. In other embodiments, for example, the rear surface 89S may have a plurality of ribs or may be an uneven surface including projections and depressions. In the illustrative embodiment, the first direction D1 corresponds to the right-left direction and the second direction D2 corresponds to the top-bottom direction. The second direction D2 changes in response to pivoting of the scanner 8. The wall portion 89 has a central portion and right and left end portions with respect to the right-left direction. The right and left end portions protrude rearward relative to the central portion. The rear surface 89S extends along the profile of the wall portion 89 and thus has corners.

Figure 5:
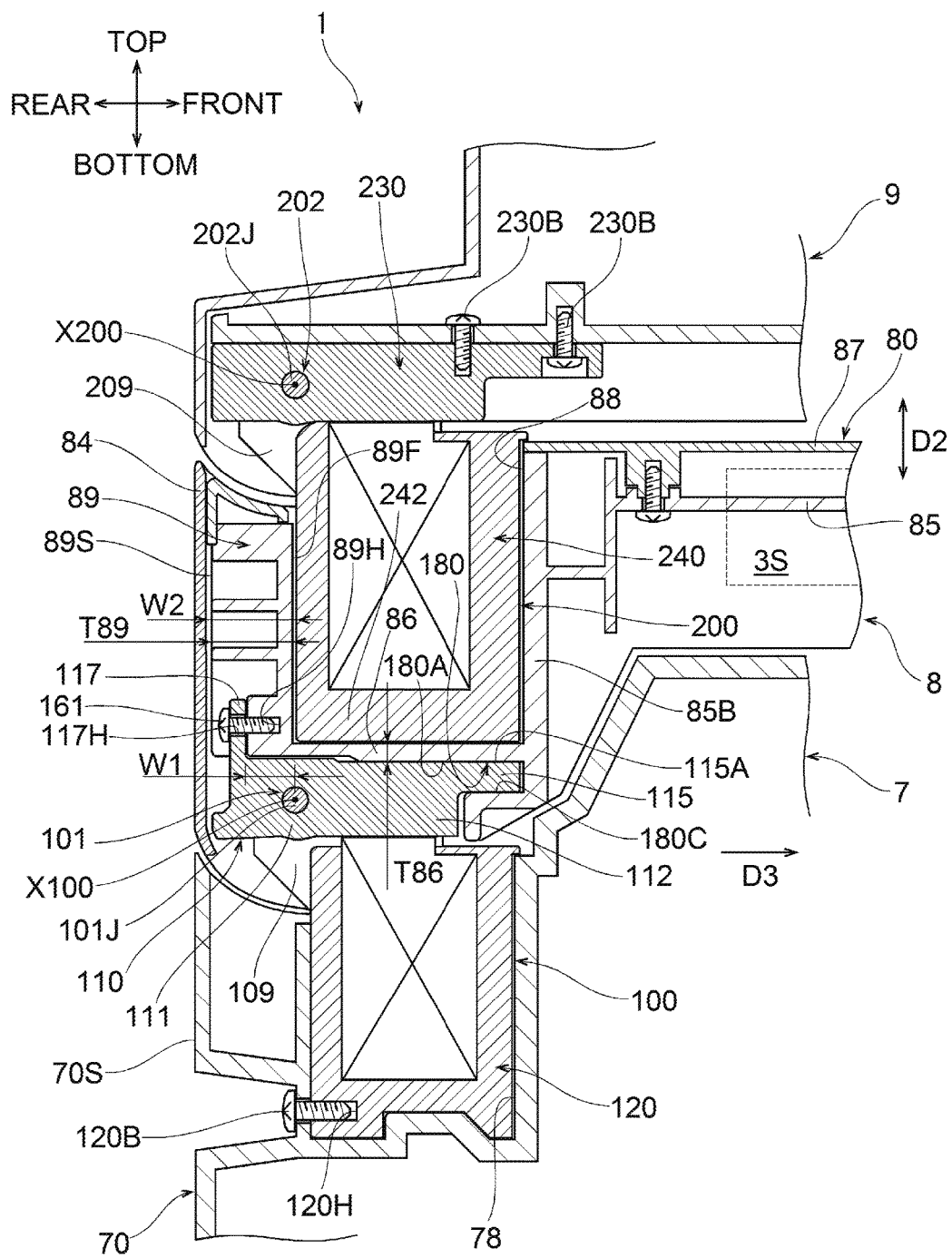
FIG. 5 is a partial sectional view taken along line A-A of FIG. 4 in the illustrative embodiment according to one or more aspects of the disclosure, and illustrating a left one of first hinges and a left one of second hinges when the scanner is located at a first position and a cover unit is located at a third position.

As illustrated in FIGS. 5 to 7, the scanner housing 80 further includes an exterior cover 84. The exterior cover 84 covers the wall portion 89 from rear. The exterior cover 84 extends between a position higher than an upper end of the wall portion 89 and a position lower than a lower end of the wall portion 89.

As illustrated in FIG. 8, the scanner frame 87 has a first opening 87A and a second opening 87B. The first opening 87A may have a rectangular shape extending along both the front-rear direction and the right-left direction. The first opening 87A has a relatively large area. The second opening 87B is positioned to the left of the first opening 87A. The second opening 87B may be a narrow rectangular shape. The second opening 87B has longer sides extending along the front-rear direction and shorter sides extending along the right-left direction.

The support surface 81A is defined by a portion of an upper surface of the platen glass 81 exposed through the first opening 87A. A scanning surface 82A is defined by another portion of the upper surface of the platen glass 81 exposed through the second opening 87B.

As illustrated in FIG. 2, the scanner 8 further includes a scanner sensor 3S in the scanner housing 80. The scanner sensor 3S is an example of a "scanning unit". The scanner sensor 3S is located in a space defined by the front, rear, right, and left walls in the scanner housing 80. The scanner sensor 3S is supported by a scanning mechanism (not illustrated). The scanner sensor 3S is configured to reciprocate along the right-left direction below the support surface 81A and the scanning surface 82A (refer to FIG. 8) by the scanning mechanism. The scanner sensor 3S is configured to stop at a particular position below the scanning surface 82A. This position may be referred to as a stationary scan position. The scanner sensor 3S may be a well-known image scanner sensor, for example, a contact image sensor ("CIS") or a charge-coupled device ("CCD").

When the scanner sensor 3S scans an image of a stationary document, the support surface 81A of the platen glass 81 supports the document from below. The document to be scanned may be, for example, paper, an overhead projector sheet, or a book. When the scanner sensor 3S stays at the stationary scan position and scans an image of each of one or more document sheets SH being conveyed one by one by a conveyor unit 4, the scanning surface 82A of the platen glass 81 supports, from below, the document sheet SH being conveyed.

As illustrated in FIG. 2, the cover unit 9 includes the conveyor unit 4. The conveyor unit 4 includes a document feed tray 91, a document discharge tray 91, and conveyor rollers (not illustrated).

The document feed tray 91 and the document discharge tray 92 are disposed at a right portion of the cover unit 9. The document discharge tray 92 is located below the document feed tray 91. The document feed tray 91 supports one or more scanning-target document sheets SH to be conveyed by the conveyor unit 4. The conveyor unit 4 is configured to successively separate one or more document sheets SH supported by the document feed tray 91, into a single document sheet SH, and convey the separated document sheet SH along a conveyance path P1 such that the document sheet SH being conveyed passes over the scanner sensor 3S positioned at the stationary scan position. One or more document sheets SH that have passed over the scanner sensor 3S are discharged onto the document discharge tray 92.

<Image Scanning Operation>

For scanning an image from a document supported by the support surface 81A in the multifunction device 1, the scanning mechanism causes the scanner sensor 3S to reciprocate along the right-left direction between a scan-start position and a scan-end position. The scan-start position may be a position under a left end of the support surface 81A. The scan-end position may be a position under a right end of the support surface 81A. Through the reciprocation, the scanner sensor 3S scans an image from the document supported by the support surface 81A. After the scanning is completed, the scanning mechanism causes the scanner sensor 3S to return to a standby position.

For scanning an image from each of one or more document sheets SH supported by the document feed tray 91 in the multifunction device 1, the scanning mechanism causes the scanner sensor 3S to move to and remain at the stationary scan position under the scanning surface 82A. When the conveyor unit 4 conveys one of the one or more document sheets SH from the document feed tray 91 along the conveyance path P1, the document sheet SH passes over the scanner sensor 3S at the stationary scan position while the document sheet SH contacts the scanning surface 82A. Thus, the scanner sensor 3S scans an image of the document sheet SH passing over the scanner sensor 3S. Then, the conveyor unit 4 discharges, onto the document discharge tray 92, the document sheet SH whose image has been scanned.

<Detailed Configuration of First and Second Hinges>

Hereinafter, the first hinges 100 and the second hinges 200 will be described in detail. Since the right and left first hinges 100 have the same configuration and the right and left second hinges 200 have the same configuration, the left first hinge 100 and the left second hinge 200 will be described mainly in the explanation below. In the following explanation for the configuration of the first hinge 100 and the second hinge 200, the front-rear direction and the top-bottom direction are defined with reference to a state where the scanner 8 is located at the first position and the cover unit 9 is located at the third position (refer to FIG. 5).

As illustrated in FIGS. 5 to 8 and 10 to 12, the first hinge 100 includes a first support portion 110, a second support portion 120, and a first pivot portion 101.

The second support portion 120 has a substantially rectangular parallelepiped shape having a longer dimension in the top-bottom direction than a dimension in the front-rear direction and a dimension in the right-left direction. The second support portion 120 has a longer dimension in the front-rear direction than the dimension in the right-left direction. The second support portion 120 includes a pair of bearing portions 109. The bearing portions 109 protrude upward from a rear portion of an upper end of the second support portion 120. The bearing portions 109 may be projecting portions extending along both the top-bottom direction and the front-rear direction. The bearing portions 109 face each other and are spaced from each other in the right-left direction. More specifically, for example, each of the bearing portions 109 includes a first section 109A and a second section 109B. The first section 109A protrudes from the upper end of the second support portion 120 by a relatively large amount. The second section 109B is contiguous to the first section 109A and protrudes from the upper end of the second support portion 120. The protruding amount of the second section 109B is smaller than the protruding amount of the first section 109A and decreases gradually. The first section 109A corresponds to a rear section of the bearing portion 109 and the second section 109B corresponds to a front section of the bearing portion 109. Each of the bearing portions 109 has a bearing hole 109H in the first section 109A. The bearing hole 109H penetrates the first section 109A in the right-left direction. As illustrated in FIG. 5, the second support portion 120 has a screw hole 120H in its lower rear portion. Although not illustrated, the second support portion 120 further includes therein components for implementing a free-stop function, e.g., a spring and a slide cam.

As illustrated in FIGS. 5 to 7, the printer 7 includes a printer housing 70. The printer housing 70 has right and left first recessed portions 78 in an upper end portion thereof. The first recessed portions 78 are defined near a rear surface 70S of the printer housing 70. In FIGS. 5 to 7, the left first recessed portion 78 is illustrated but the right first recessed portion 78 is omitted. Nevertheless, the right and left first recessed portions 78 have the same configuration. The left first recessed portion 78 is positioned corresponding to the second support portion 120 of the left first hinge 100. The right first recessed portion 78 is positioned corresponding to the second support portion 120 of the right first hinge 100.

The first recessed portions 78 are positioned near the first axis X100 and are recessed toward the bottom. The second support portions 120 of the first hinges 100 are placed in the respective first recessed portions 78 by insertion from above. The second support portions 120 are fastened to the printer housing 70 using respective screws 120B. The screws 120B are screwed in the respective screw holes 120H of the second support portions 120 through the rear surface 70S of the printer housing 70.

Figure 10:
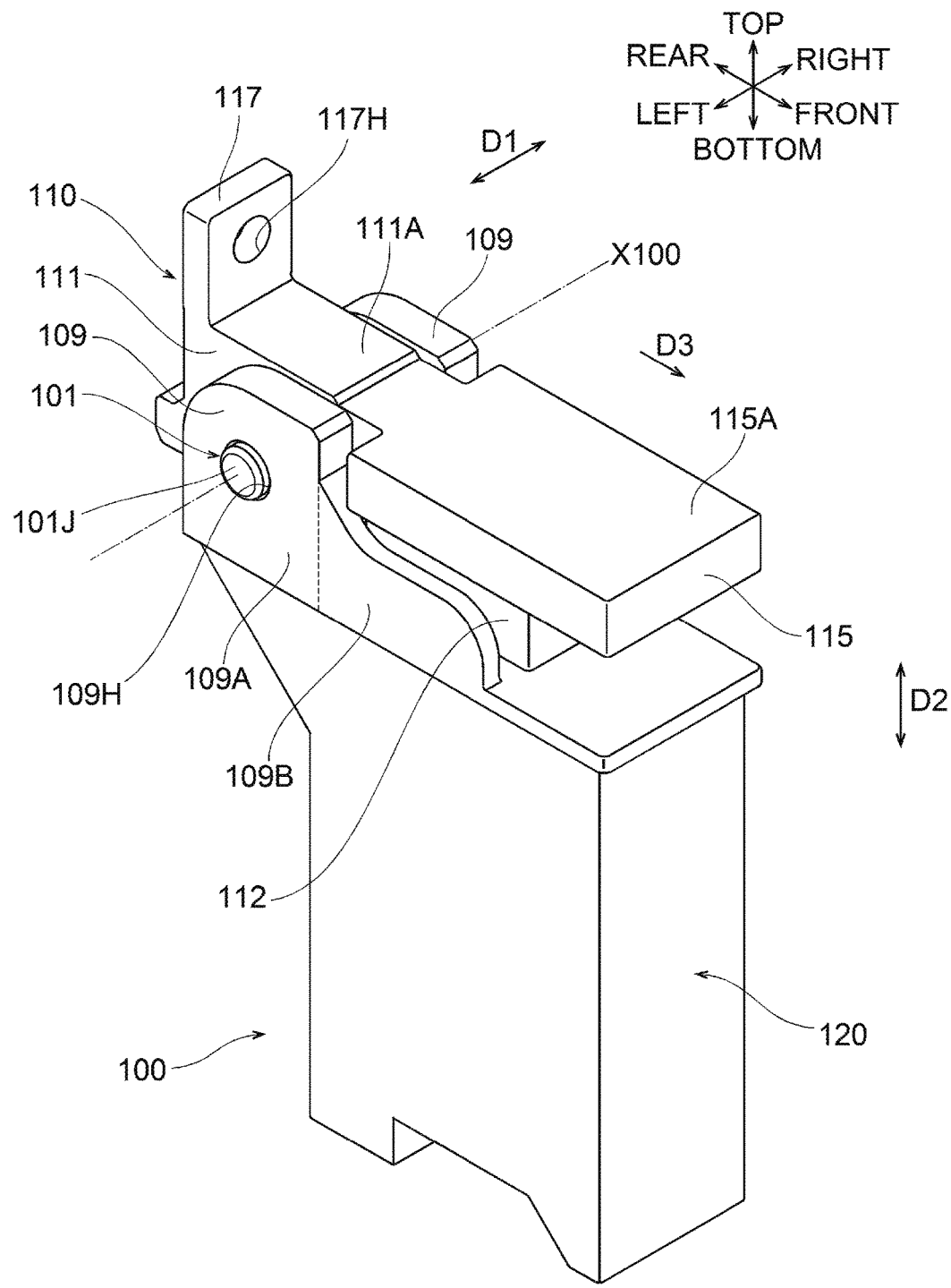
FIG. 10 is a perspective view of one of the first hinges in the illustrative embodiment according to one or more aspects of the disclosure.
Figure 11:
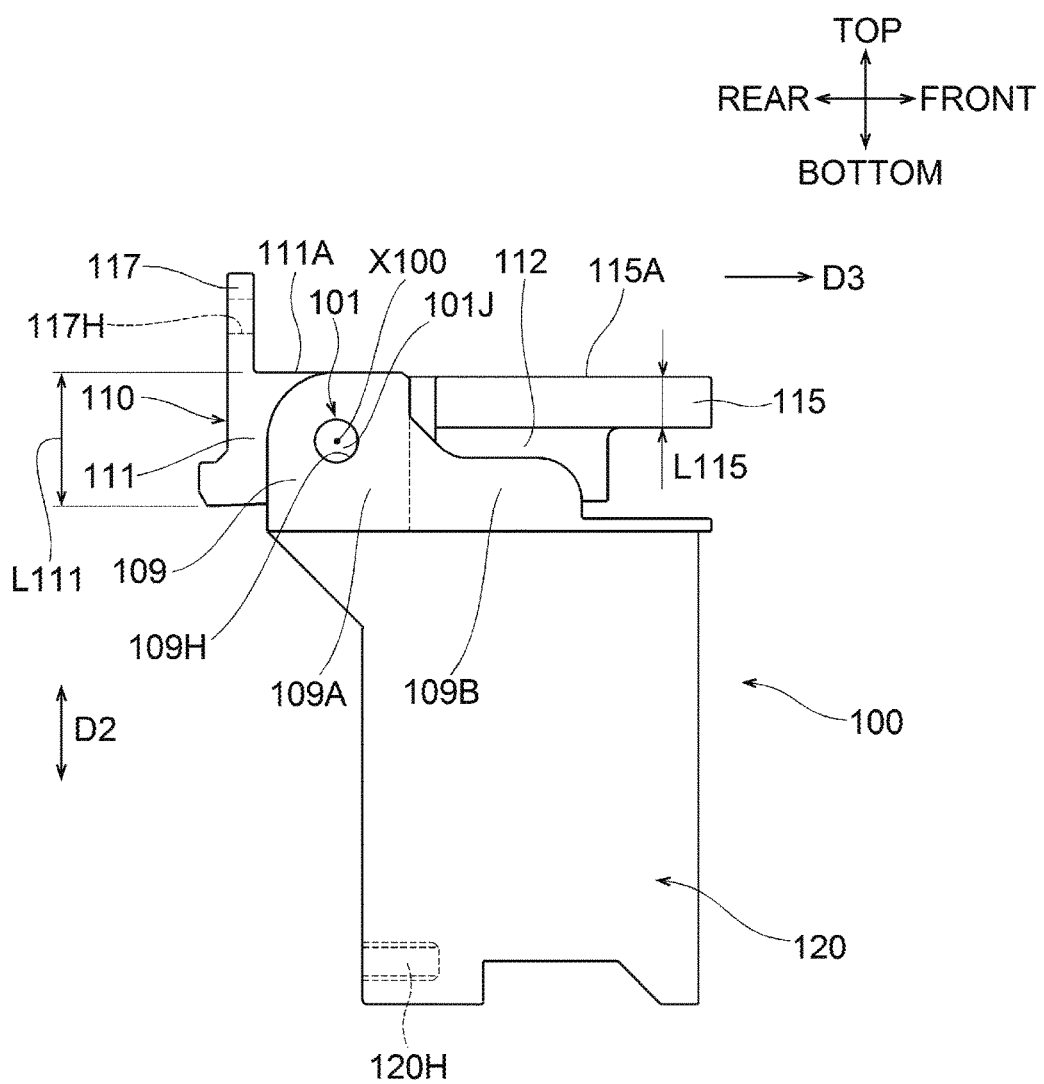
FIG. 11 is a left side view of the first hinge of FIG. 10 in the illustrative embodiment according to one or more aspects of the disclosure.
Figure 12:
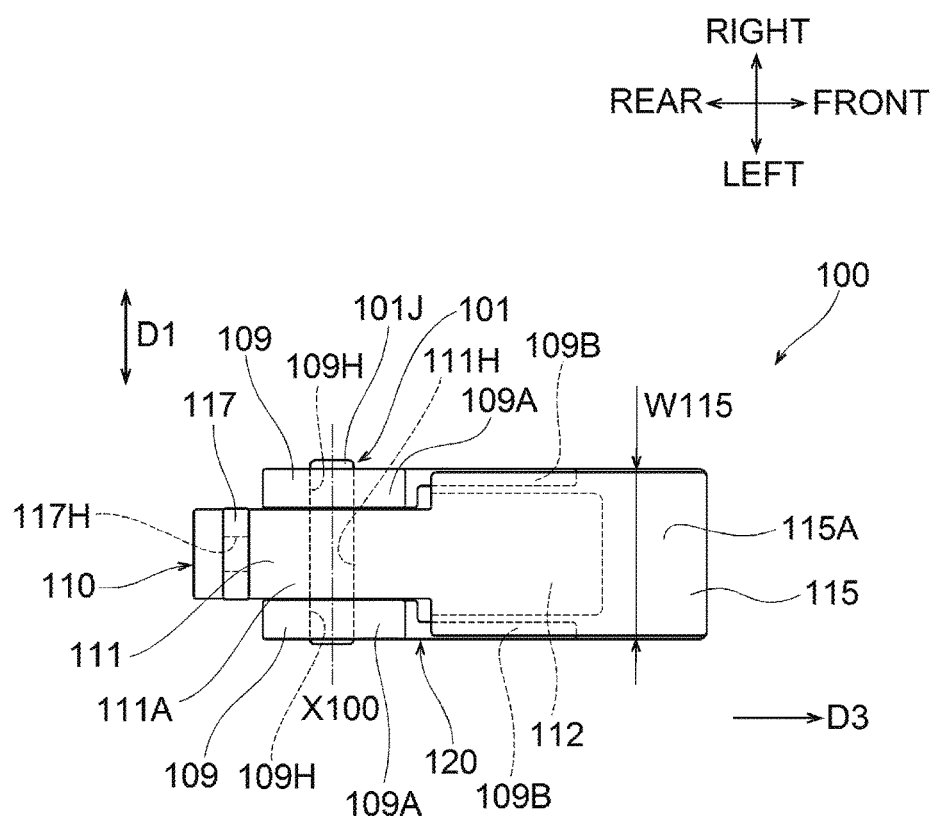
FIG. 12 is a top view of the first hinge of FIG. 10 in the illustrative embodiment according to one or more aspects of the disclosure.

As illustrated in FIGS. 10 to 12, the first support portion 110 has a substantially rectangular parallelepiped shape having a longer dimension in the front-rear direction than a dimension in the right-left direction. The first support portion 110 may be made of, for example, resin. The first support portion 110 includes a first end portion 111, a second end portion 112, and a projecting portion 117. As illustrated in FIGS. 10 and 12, the first support portion 110 is positioned between the bearing portions 109 of the second support portion 120. The first end portion 111 corresponds to a rear end portion of the first support portion 110. The first end portion 111 is positioned between the first sections 109A of the bearing portions 109 in the right-left direction. The second end portion 112 corresponds to a front end portion of the first support portion 110. The second end portion 112 is positioned between the second sections 109B of the bearing portions 109 in the right-left direction.

As illustrated in FIG. 12, the first end portion 111 of the first support portion 110 has a through hole 111H penetrating therethrough in the right-left direction. A first pivot shaft 101J extends through the through hole 111H with its end portions protruding from respective ends of the through hole 111H. The protruding end portions of the first pivot shaft 101J are engaged with the respective bearing holes 109H of the bearing portions 109. The through hole 111H of the first end portion 111, the first pivot shaft 101J, and the bearding holes 109H of the bearing portions 109 constitute the first pivot portion 101. The first pivot portion 101 provides the first axis X100. The first support portion 110 is configured to pivot up (refer to FIGS. 5 and 11) and down (refer to FIG. 6) about the first axis X100 relative to the second support portion 120.

As illustrated in FIGS. 10 to 12, the second end portion 112 of the first support portion 110 is opposite to the first end portion 111 in a direction toward the front. That is, as illustrated in FIG. 5, the second end portion 112 is opposite to the first end portion 111 in a third direction D3 which is from the rear surface 89S of the wall portion 89 toward the scanner sensor 3S. In the illustrative embodiment, the third direction D3 may be a frontward direction. Nevertheless, the third direction D3 changes in response to rotation of the scanner 8.

As illustrated in FIGS. 10 to 12, the second end portion 112 has a substantially T-shape in cross section, in which an upper portion of the second end portion 112 is wider than a lower portion thereof in the right-left direction. The second end portion 112 extends frontward relative to the first end portion 111. The upper portion of the second end portion 112 has a right end portion and a left end portion that face the respective second sections 109B of the bearing portions 109 from above. The upper portion (i.e., the wide portion) of the second end portion 112 has a substantially flat-plate shape, and a portion of the upper portion of the second end portion 112 protrudes frontward relative to the lower portion of the second end portion 112. The protruding portion of the upper portion of the second end portion 112 serves as an accommodated portion 115.

The accommodated portion 115 has a flat upper surface 115A that is substantially coplanar with an upper surface 111A of the first end portion 111. As illustrated in FIG. 11, the accommodated portion 115 has a dimension L115 in the top-bottom direction smaller than a dimension L111 of the first end portion 111 in the top-bottom direction.

The projecting portion 117 is disposed further to the rear than the first pivot portion 101 and protrudes upward (e.g., toward the cover unit 9 along the second direction D2) from the upper surface 111A of the first end portion 111. The projecting portion 117 has a substantially flat-plate shape and has a dimension in the right-left direction substantially equal to a dimension of the first support portion 110 in the right-left direction. The projecting portion 117 has a through hole 117H penetrating therethrough in the front-rear direction.

As illustrated in FIGS. 5 and 9, the scanner base 85 further includes accommodating portions 180. The wall portion 89 of the scanner base 85 includes the accommodating portions 180. More specifically, for example, the rearwardly-protruding right and left end portions of the wall portion 89 include the respective accommodating portions 180. The accommodating portions 180 have the same or similar configuration. Therefore, one of the accommodating portions 180 will be described mainly, and the explanation for the other will be omitted appropriately. The accommodating portion 180 is recessed toward the front relative to the rear surface 89S of the wall portion 89, that is, the accommodating portion 180 is recessed in the third direction D3 relative to the rear surface 89S of the wall portion 89. The accommodating portion 180 has an accommodation space 180C in its front portion. The accommodation space 180C has a substantially rectangular parallelepiped shape corresponding to the shape of the accommodated portion 115 of the second end portion 112. More specifically, for example, the front portion of each of the accommodating portions 180 has upper, lower, right, left, and front walls, and these walls define the accommodation space 180C. One of inner surfaces defining the accommodating portion 180 may be a downwardly-facing flat surface, which is referred to as a contact surface 180A.

The accommodation space 180C has a dimension in the top-bottom direction slightly greater than the dimension L115 of the accommodated portion 115 in the top-bottom direction (refer to FIG. 11). The accommodation space 180C has a dimension in the right-left direction slightly greater than a dimension L115 of the accommodated portion 115 in the right-left direction (refer to FIG. 12).

As illustrated in FIGS. 5 and 9, the scanner base 85 has screw holes 89H in the wall portion 89. The screw holes 89H are positioned above the respective accommodating portions 180 and are recessed toward the front.

The first support portion 110 of each of the first hinges 100 is supported by the scanner base 85 of the scanner 8 as described below. In FIG. 5, although the right first hinge 100 is not illustrated, the right first hinge 100 is supported by the scanner base 85 in the same manner. For example, as illustrated in FIG. 5, the accommodated portion 115 of the first support portion 110 is fully positioned in the accommodation space 180C of the accommodating portion 180 by insertion of the first support portion 110 into the accommodating portion 180 through the rear surface 89S of the wall portion 89 of the scanner base 85. In this state, the accommodated portion 115 is securely engaged with the accommodation space 180C and is held in the accommodation space 180C with respect to both the top-bottom direction and the right-left direction. The upper surface 115A of the accommodated portion 115 and the contact surface 180A of the accommodating portion 180 are both flat surfaces and thus have surface contact at a relatively large area.

In a state where the accommodated portion 115 is fully positioned in the accommodation space 180C, the projecting portion 117 of the first support portion 110 contacts the rear surface 89S of the wall portion 89. In this state, the screw 161 is screwed in the screw hole 89H of the rear surface 89S of the wall portion 89 through the through hole 117 H of the projecting portion 117 from the rear. That is, the screw 161 is screwed in the third direction D3. The screw 161 connects the projecting portion 117 of the first hinge 100 to the scanner base 85 and therefore restricts separation of the projecting portion 117 from the scanner base 85 in a direction opposite to the third direction D3, i.e., toward the rear. The screw 161 is an example of a "coupling member".

The exterior cover 84 covers the projecting portions 117 and the screws 161. The exterior cover 84 is attached to the wall portion 89 after the projecting portion 117 of each of the first hinges 100 is connected to the scanner base 85 by the screw 161. With this configuration, the projecting portions 117 and the screws 161 are concealed from the outside of the multifunction device 1.

As illustrated in FIGS. 5 to 7, the second hinge 200 includes a third support portion 230, a fourth support portion 240, and a second pivot portion 202.

The fourth support portion 240 has a substantially rectangular parallelepiped shape having a longer dimension in the top-bottom direction than a dimension in the front-rear direction and a dimension in the right-left direction. The fourth support portion 240 has a longer dimension in the front-rear direction than the dimension in the right-left direction. The fourth support portion 240 includes a pair of bearing portions 209. The bearing portions 209 protrude upward from a rear portion of an upper end of the fourth support portion 240. In FIG. 5, the left bearing portion 209 is illustrated but the right bearing portion 209 is omitted. The fourth support portion 240 includes therein components for implementing a free-stop function, e.g., a spring and a slide cam.

As illustrated in FIGS. 5 to 7, the scanner housing 80 further has right and left second recessed portions 88 in a rear end portion thereof. In FIGS. 5 to 7, the left second recessed portion 88 is illustrated but the right second recessed portion 88 is omitted. The second recessed portion 88 is an example of a "recessed portion". In the scanner base 85 constituting the scanner housing 80, each of the second recessed portions 88 is defined by a wall 85B and the front surface 89F of the wall portion 89, and has an open upper end. The wall 85B also defines the space in which the scanner sensor 3 moves. In FIGS. 5 to 7, although the right second recessed portion 88 is omitted, the right and left second recessed portions 88 have the same configuration. The left second recessed portion 88 is positioned corresponding to the fourth support portion 240 of the left second hinge 200. The right second recessed portion 88 is positioned corresponding to the fourth support portion 240 of the right second hinge 200. As illustrated in FIG. 8, the scanner frame 87 constituting the scanner housing 80 has openings 87C at respective positions corresponding to the respective second recessed portions 88. The openings 87C have a shape corresponding to the shape of the respective second recessed portions 88.

As illustrated in FIGS. 5 to 7, the second recessed portion 88 is positioned near the second axis X200 and is recessed toward the bottom. The fourth support portion 240 of the second hinge 200 is placed in the second recessed portion 88 by insertion from above, and is supported by the scanner housing 80 so as to be movable in the top-bottom direction. In a case where a document supported by the support surface 81A is relatively thick, e.g., in a case where a relatively thick book is placed on the support surface 81A, the fourth support portion 240 moves upward within the second recessed portion 88 in accordance with the thickness of the document.

The third support portion 230 has a substantially rectangular parallelepiped shape having a longer dimension in the front-rear direction than a dimension in the right-left direction. The third support portion 230 may be made of, for example, resin. The third support portion 230 is located above the fourth support portion 240. The third support portion 230 overlaps the bearing portions 209 of the fourth support portion 240 when viewed in the right-left direction. A second pivot shaft 202J extends through the third support portion 230 and the bearing portions 209 of the fourth support portion 240. The second pivot shaft 202J, the third support portion 230, the bearing portions 209 of the fourth support portion 240 constitute the second pivot portion 202. The second pivot portion 202 provides the second axis X200. The third support portion 230 is configured to pivot up (refer to FIG. 5) and down (refer to FIG. 7) about the second axis 200 relative to the fourth support portion 230.

The third support portion 230 is fastened to a frame of the cover unit 9 by screws 230B through a front end portion thereof. Thus, the third support portion 230 is supported by the cover unit 9.

It is conceivable that the first support portion 110 of the first hinge 100 is fastened to the bottom of the scanner base 85 by a screw that is long enough to reach the bottom of the scanner base 85, through the first support portion 110, from the lower surface of the first support portion 110. Nevertheless, in the illustrative embodiment, it may be unnecessary to adopt such a fastening method. It may also be unnecessary to increase the thickness of the bottom of the scanner base 85 in order to secure a strength of the bottom of the scanner base 85 for fastening the first support portion 110 by the screw. Therefore, as illustrated in FIG. 5, a plate-shaped portion 86 of the scanner base 85 positioned above the first support portion 110 may have a relatively small dimension T86 in the top-bottom direction (e.g., a relatively thin thickness). In the illustrative embodiment, the first support portion 110 and the scanner base 85 are connected to each other at the location further to the rear than the second hinge 200 and the second recessed portion 88. More specifically, for example, an end portion of the fourth support portion 240 that is located away from the second axis X200 in the second direction D2, i.e., a lower end portion 242 of the fourth support portion 240, overlaps the screw 161 when viewed in the third direction D3. That is, the first support portion 110 and the scanner base 85 are connected to each other at such a location that does not increase the dimension of the surrounding portions of the first hinge 100 and the second hinge 200 in the top-bottom direction.

In the illustrative embodiment, the first pivot portion 101 and the projecting portion 117 are spaced apart a first distance W1 in the third direction D3. The fourth support portion 240 and the exterior cover 84 are spaced apart a second distance W2 in the third direction D3. The first distance W1 is less than but nearly equal to the second distance W2. The wall portion 89 is located between the fourth support portion 240 and the exterior cover 84. The wall portion 89 has a thickness T89 less than but nearly equal to the second distance W2. With this configuration, the thickness of the wall portion 89 may be ensured sufficiently.

As illustrated in FIG. 4, the second support portions 120 of the first hinges 100 overlap the respective fourth support portions 240 of the second hinges 200 when viewed in the top-bottom direction, and are substantially aligned with the respective fourth support portions 240 of the second hinges 200 in the front-rear direction and in the right-left direction.

<Effects>

As illustrated in FIGS. 5 and 9, in the multifunction device 1 according to the illustrative embodiment, the accommodating portions 180 of the scanner housing 80 are recessed toward the front (e.g., in the third direction D3). As illustrated in FIG. 5, in the first support portion 110, the second end portion 112 is opposite to the first end portion 111 in a direction toward the front. The first support portion 110 is accommodated in the accommodating portion 180 while the accommodated portion 115 that is the front end portion of the second end portion 112 is fixedly engaged in the accommodation space 180C. That is, in the multifunction device 1, the second end portion 112 of the first support portion 110 is held by the scanner base 85. With this configuration, it may be unnecessary to fasten, by the screw, the first support portion 110 of the first hinge 100 to the bottom of the scanner base 85, for example, to the plate-shaped portion 86 of the scanner base 85. Therefore, the bottom of the scanner base 85 might not need to have a sufficient thickness for fastening the first support portion 110. Thus, the plate-shaped portion 86 of the scanner base 85 may have a relatively thin thickness T86. Consequently, the size of the scanner housing 80 may be reduced in the top-bottom direction.

Therefore, the size of the multifunction device 1 may be reduced in the top-bottom direction. In addition, the fastening of the first hinge 100 to the scanner base 85 using a screw may be simplified. More specifically, for example, the projecting portion 117 of the first hinge 100 is connected to the scanner base 85 by the screw 161 only. Consequently, the fastening of the first hinge 100 to the scanner base 85 may be simplified.

As illustrated in FIG. 5, the screw 161 connects the projecting portion 117 of the first hinge 100 to the scanner base 85. This configuration may reduce or prevent the accommodated portion 115 of the first support portion 110 from coming out from the accommodation space 180C. Therefore, the second end portion 112 of the first support portion 110 may be surely held by the scanner base 85.

In the multifunction device 1, the screw 161 is screwed in the scanner base 85 of the scanner housing 80 through the projecting portion 117 of the first support portion 110 in the third direction D3 (e.g., the direction toward the front). Thus, the screwing direction of the screw 161 is perpendicular to the top-bottom direction. Therefore, the first supporting portion 110 and the scanner base 85 may be connected to each other without impeding the size reduction of the scanner housing 80 in the top-bottom direction.

In the multifunction device 1, the lower end portion 242 of the fourth support portion 240 of the second hinge 200 overlaps the screw 161 when viewed in the third direction D3. That is, this configuration does not require fastening of the first support portion 110 of the first hinge 100 to the plate-shaped portion 86 of the scanner base 85 by the screw 161. Therefore, this configuration may enable the second recessed portion 88 to have a deep depth in which the fourth support portion 240 of the second hinge 200 is inserted close to the bottom of the scanner base 85. Thus, the scanner base 85 may support the fourth support portion 240 of the second hinge 200 stably, whereby the second hinge 200 may support the cover unit 9 stably.

As illustrated in FIG. 4, in the multifunction device 1, the second support portions 120 of the first hinges 100 overlap the respective fourth support portions 240 of the second hinges 200 when viewed in the top-bottom direction. Therefore, this configuration may be effective in reducing the size of the multifunction device 1 in the right-left direction (e.g., in the first direction D1).

As illustrated in FIG. 5, in the multifunction device 1, the exterior cover 84 of the scanner 8 covers the projecting portions 117 and the screws 161 (the right projecting portion 117 and the right screw 161 are omitted in FIG. 5). Therefore, the projecting portions 117 and the screws 161 are concealed from the outside of the multifunction device 1, whereby appearance of the multifunction device 1 may be enhanced.

As illustrated in FIG. 5, in the multifunction device 1, the first distance W1 (e.g., the distance between the first pivot portion 110 and the projecting portion 117 in the third direction D3) is less than but nearly equal to the second distance W2 (e.g., the distance between the fourth support portion 240 and the exterior cover 84 in the third direction D3). The wall portion 89 located between the fourth support portion 240 and the exterior cover 84 has the thickness T89 less than but nearly equal to the second distance W2. Therefore, this configuration may enable the wall portion 89 to have a sufficient thickness, and thus, the wall portion 89 may reinforce the second recessed portions 88 in which the fourth support portions 240 of the second hinges 200 are inserted respectively.

As illustrated in FIG. 11, in the multifunction device 1, the accommodated portion 115 has the dimension L115 in the top-bottom direction smaller than the dimension L111 of the first end portion 111 in the top-bottom direction. Thus, the accommodated portion 115 has a relatively small dimension in the top-bottom direction. Therefore, there is no need to provide, in the scanner base 85, a large space for serving as the accommodating portion 180 having the accommodation space 180C. Consequently, the size of the scanner base 85 and eventually the size of the scanner housing 80 may be surely reduced in the top-bottom direction.

As illustrated in FIGS. 5 and 9, in the multifunction device 1, the contact surface 180A of the accommodating portion 180 and the upper surface 115A of the accommodated portion 115 are both flat surfaces and thus have surface contact at a relatively large area. With this configuration, therefore, when the scanner unit 8 is being pivoted, the contact surface 180A may receive a load on the first support portion 110 of the first hinge 100 appropriately. Consequently, this configuration may reduce or prevent damage to the first support portions 110 of the first hinges 100 or damage to the surrounding portions of the accommodating portions 180 in the scanner base 85.

(Variation)

Figure 13:
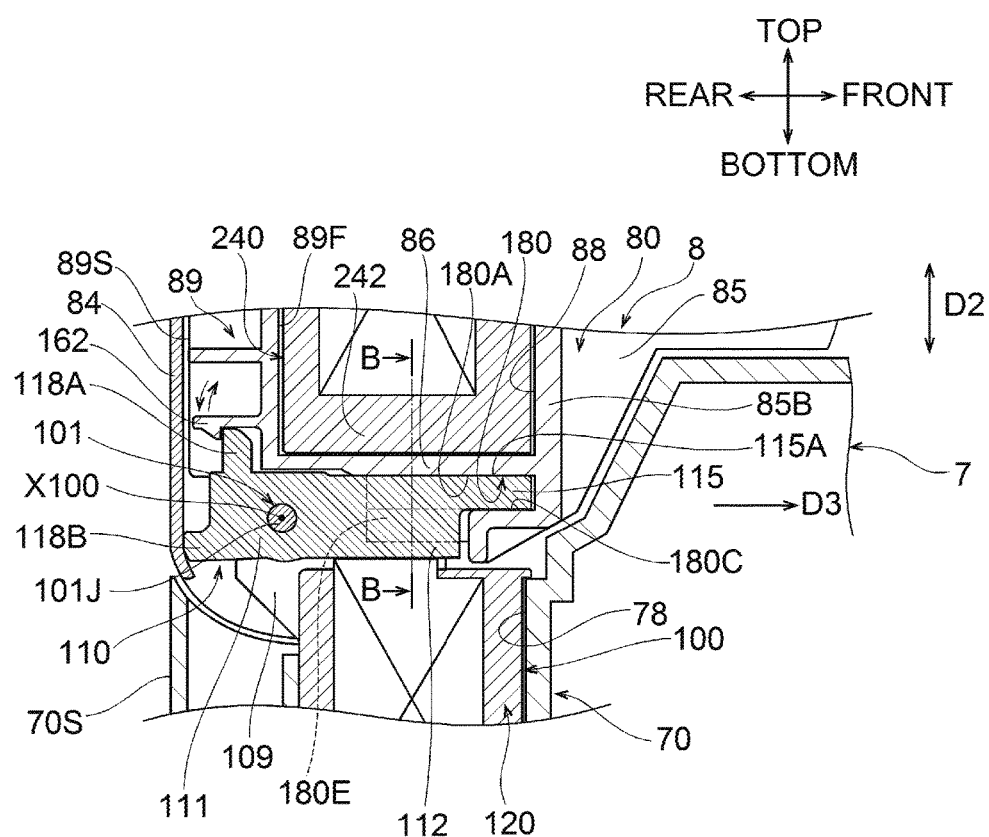
FIG. 13 is a partial sectional view, similar to the view of FIG. 5, illustrating a multifunction device in a variation of the illustrative embodiment according to one or more aspects of the disclosure.

In the illustrative embodiment, the first support portion 110 of the first hinge 100 is fastened to the scanner base 85 by engagement of the projecting portion 117 and the screw 161 with each other. Nevertheless, in a variation of the illustrative embodiment, for example, as illustrated in FIG. 13, the wall portion 89 may have an elastically-deformable hook 162 at its wall surface 89S and the first support portion 110 of the first hinge 100 may have a projecting portion 118A extending upward from the first end portion 111. In this case, the hook 162 may be engaged with the projecting portion 118A. The first support portion 110 may further include another projecting portion 118B extending rearward from the first end portion 111. In this case, the exterior cover 84 may contact the projecting portion 118B. This configuration may also reduce or prevent the accommodated portion 115 from coming out from the accommodation space 180C.

Figure 14:
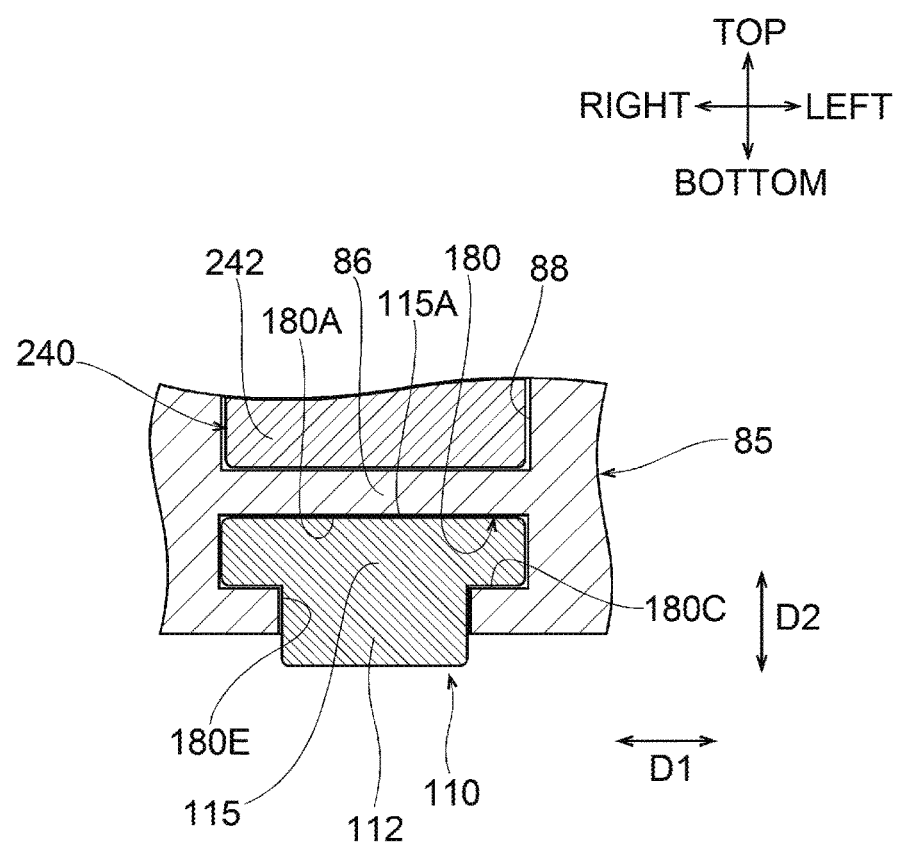
FIG. 14 is a partial sectional view taken along line B-B of FIG. 13 in the variation of the illustrative embodiment according to one or more aspects of the disclosure.

As illustrated in FIGS. 13 and 14, the accommodation space 180C may be extended toward the rear, and an extended portion 180E may have a substantially T-shape in cross section. With this configuration, the accommodated portion 115 may engage with the accommodation space 180C at a larger area in the front-rear direction.

While the disclosure has been described in detail with reference to the specific embodiment thereof, this is merely an example, and various changes, arrangements and modifications may be applied therein without departing from the spirit and scope of the disclosure.

What is claimed is:

1. A multifunction device comprising:
    a scanner including a housing, a support surface configured to support a document, and a scanning unit located in the housing and configured to scan an image of the document;
    a printer disposed below the scanner and including an image forming unit configured to form an image on a sheet; and
    a first hinge connecting the scanner to the printer to allow the scanner to pivot, about a first axis extending along a first direction, between a first position at which the scanner conceals an upper portion of the printer, and a second position at which the scanner exposes the upper portion of the printer,
    wherein the first hinge includes:
        a first support portion supported by the scanner;
        a second support portion supported by the printer; and
        a first pivot portion disposed between the first support portion and the second support portion and defining the first axis,
    wherein the housing of the scanner includes:
        a side surface near the first axis and extending along the first direction and along a second direction which is perpendicular to the support surface of the scanner;
        a coupling member; and
        an accommodating portion recessed in a third direction which is from the side surface toward the scanning unit,
    wherein the first support portion of the first hinge includes:
        a first end portion at which the first pivot portion is located;
        a second end portion which is opposite to the first end portion in the third direction and includes an accommodated portion, the accommodated portion being accommodated in the accommodating portion of the housing; and
        a projecting portion located farther from the second end portion than the first pivot portion and projecting from the first end portion along the second direction, and
    wherein the coupling member of the housing is coupled to the projecting portion of the first support portion to restrict the projecting portion from moving away from the housing in a direction opposite to the third direction.

2. The multifunction device according to claim 1, wherein the coupling member comprises a screw inserted, in the third direction, through the projecting portion of the first support portion into the housing of the scanner.

3. The multifunction device according to claim 2, further comprising:
    a cover unit disposed above the scanner; and
    a second hinge connecting the cover unit to the scanner to allow the cover unit to pivot, about a second axis extending along the first direction, between a third position at which the cover unit conceals the support surface of the scanner, and a fourth position at which the cover unit exposes the support surface,
    wherein the second hinge includes:
        a third support portion supported by the cover unit;
        a fourth support portion supported by the scanner; and
        a second pivot portion disposed between the third support portion and the fourth support portion and defining the second axis,
    wherein the housing of the scanner includes a recessed portion near the second axis and recessed along the second direction and away from the cover unit, and
    wherein the fourth support portion of the second hinge is inserted in the recessed portion and includes an end portion which is away from the second axis with respect to the second direction, the end portion overlapping the screw when viewed in the third direction.

4. The multifunction device according to claim 3, wherein the second support portion of the first hinge overlaps the fourth support portion of the second hinge when viewed in a vertical direction.

5. The multifunction device according to claim 3, wherein the scanner includes an exterior cover configured to cover the projecting portion of the first support portion and the coupling member of the housing.

6. The multifunction device according to claim 5, wherein a first distance, in the third direction, between the first axis of the first pivot portion and the projecting portion is less than a second distance, in the third direction, between the fourth support portion and the exterior cover, and the housing includes a wall portion located between the fourth support portion and the exterior cover and having a thickness which is less than the second distance.

7. The multifunction device according to claim 1, wherein a dimension of the accommodated portion along the second direction is less than a dimension of the first end portion along the second direction.

8. The multifunction device according to claim 1, wherein the accommodating portion of the housing of the scanner has a contact surface in contact with an upper surface of the accommodated portion of the second end portion of the first support portion of the first hinge.

\* \* \* \* \*